United States Patent [19]

Aso et al.

[11] Patent Number: 4,880,957
[45] Date of Patent: Nov. 14, 1989

[54] WIRE-CUT ELECTRICAL DISCHARGE MACHINE WITH ELECTRIC SHOCK PREVENTER

[75] Inventors: Toshiyuki Aso, Hino; Hiroshi Hosoda, Hachioji, both of Japan

[73] Assignee: Fanuc Ltd., Yamanashi, Japan

[21] Appl. No.: 298,606

[22] PCT Filed: Apr. 1, 1988

[86] PCT No.: PCT/JP88/00338
§ 371 Date: Nov. 29, 1988
§ 102(e) Date: Nov. 29, 1988

[87] PCT Pub. No.: WO88/07429
PCT Pub. Date: Oct. 6, 1988

[30] Foreign Application Priority Data

Apr. 2, 1987 [JP] Japan .................................. 62-79667

[51] Int. Cl.[4] ............................................. B23H 7/04
[52] U.S. Cl. .............................. 219/69.12; 219/69.19
[58] Field of Search ............... 219/69.19, 69.12, 69.13; 204/206, 224 M

[56] References Cited

U.S. PATENT DOCUMENTS

| | | | |
|---|---|---|---|
| 4,663,509 | 5/1987 | Kawashima | 219/69.12 |
| 4,667,077 | 5/1987 | Goto | 219/69.12 |
| 4,689,462 | 8/1987 | Goto | 219/69.12 |
| 4,751,364 | 6/1988 | Tobler et al. | 219/69.12 |

FOREIGN PATENT DOCUMENTS

| | | |
|---|---|---|
| 0018867 | 4/1980 | European Pat. Off. . |
| 2454206 | 7/1980 | France . |
| 55-141922 | 11/1980 | Japan . |
| 57-13125 | 1/1982 | Japan . |
| 60-186325 | 9/1985 | Japan . |
| 71065 | 10/1946 | Norway . |

OTHER PUBLICATIONS

AR Patents De Invencion 221.933, pp. 412-413, Pet. 1980.

Primary Examiner—A. D. Pellinen
Assistant Examiner—Geoffrey S. Evans
Attorney, Agent, or Firm—Armstrong, Nikaido, Marmelstien, Kubovcik & Murray

[57] ABSTRACT

A wire-cut electrical discharge machine having a device for preventing an accident due to an electrical shock, wherein a guide roller (34a) disposed just before a collection box (38) for collecting a used electrode wire (30) passed through an electrospark machining area (36) is attached to a base plate (56) made of a conductive material, the base plate being fixed to a machine body (26) through an insulating plate (58), and a current leaking to the base plate caused by a disturbance of the running of the electrode wire is led to a safety circuit (50) through a lead wire (52), and a current leakage signal is output whereby an electric power supply of a electric power source (51) is rapidly stopped to prevent an accident due to an electric shock.

3 Claims, 2 Drawing Sheets

WIRE-CUT ELECTRICAL DISCHARGE MACHINE WITH ELECTRIC SHOCK PREVENTER

TECHNICAL FIELD

The present invention relates to a wire-cut electrical discharge machine. More specifically, it is related to a wire-cut electrical discharge machine having a means for preventing an accident due to an electric shock, which means detects a disturbance in the running of an electrode wire, at an area near a used electrode wire collection section, by an electrical means, the wire passing through an electrospark machining area and being collected in the electrode wire collection section in, for example, a collection box, thereby detecting an abnormal collection of a used wire and immediately stopping an electric power supply to prevent an accident due to an electric shock.

BACKGROUND ART

An electric power for machining is supplied to an electrode wire in an electrospark machining area of a wire-cut electrical discharge machine. Namely, a discharge voltage is applied between the electrode wire and a workpiece through an electric power supply member, and thereby an electrospark is formed at a small gap therebetween in an electrospark machining area and machining is carried out. However, an electric charge remains in a used wire that has passed through the electrospark machining area and reached a used wire collection section, because of the electric power supply to the electrode wire. Therefore, in the prior art, a cover member made of an electrical insulating material such as a plastic material, is fitted over a path of the electrode wire to be collected in the wire collection section, to protect a worker from the affects of an electric shock caused by touching the electrode wire. Specifically, when the used electrode wire reaches the used wire collection section area, it is always electrically charged, because an automatic connection of wires is immediately made when an electrode wire is cut in the electrospark machining area in the latest wire-cut electrical discharge machine provided with an automatic wire connection device. In consequence, a problem arises of safety in that the wire can be touched before the same is completely collected in the wire collection section. Therefore, the cover member is fitted to prevent accidents due to an electric shock.

This safety is secured by the cover member as mentioned above when the electrode wire is normally collected while the electrospark machining is continuously carried out by an automatic connection of wires, even though an electrode wire is cut in the above-mentioned wire-cut electrical discharge machine provided with an automatic wire connection device. Nevertheless, if the problem of an over-accumulation of used electrode wire in the wire collection section occurs, a disturbance of the running of the electrode wire to the wire collection section after having passed through the electrospark machining area occurs, and the electrode wire will touch a conductive part or the machine body near the path of the running electrode wire, and consequently, an electric charge will leak through the machine portion and outside the area provided with a cover member, to cause an accident due to an electric shock.

DISCLOSURE OF THE INVENTION

Accordingly, an object of the present invention is to improve the safety during operation of a wire-cut electrical discharge machine.

In view of the above-mentioned objects, the present invention provides a wire-cut electrical discharge machine having a means for preventing an accident due to an electric shock, wherein the machine guides an electrode wire, which is fed from an electrode wire supply reel and supplied with an electric power from an electric power source via an electric power supply member, and runs to an electrode wire collection section through an electrospark machining area in which a workpiece is machined by an electrospark between the workpiece and the electrode wire, to the electrode wire collection section by means of a roller device disposed just before the electrode wire collection section, the means comprising: a safety circuit for stopping an electric power supply from the electric power source by a current signal; a conductive base plate made of a conductive material supporting the roller device; an insulating layer disposed between and electrically insulating the conductive base plate and a machine body of the wire-cut electrical discharge machine to which the conductive base plate is attached; and a lead wire for leading a current leaking from the electrode wire to the conductive base plate, to the safety circuit.

When an electrode wire touches the conductive base plate, a current leakage signal is output to the safety circuit through the lead wire, when the electrode wire running is disturbed near the roller device. Accordingly, an accident due to an electric shock is prevented by a proper treatment such as stopping an electric power supply to the wire-cut electrical discharge machine by the signal.

BEST MODE FOR CARRYING OUT THE INVENTION

Figure 3:
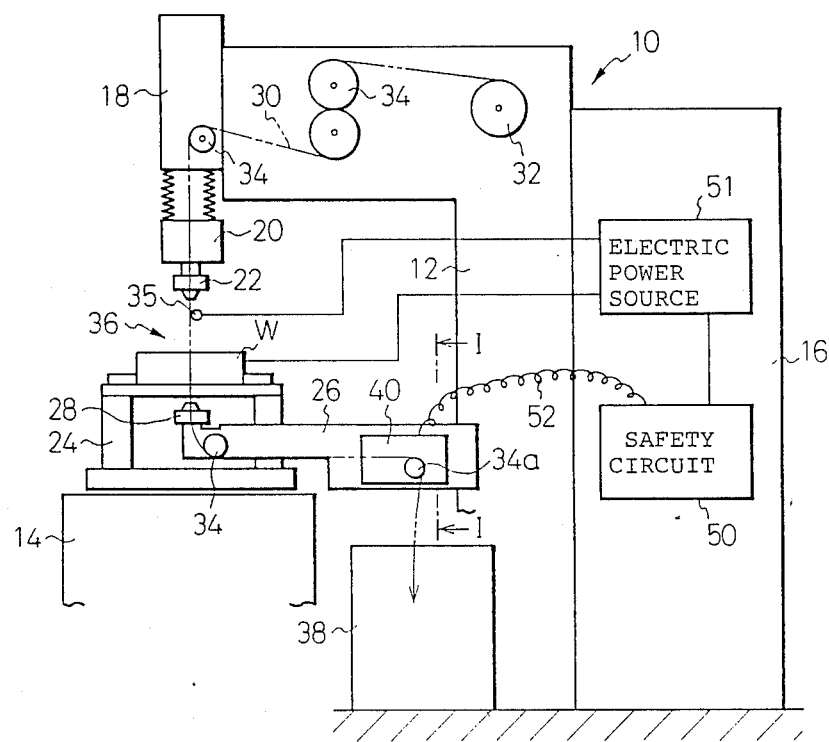
FIG. 3 is a schematic front view of a wire-cut electrical discharge machine having a means for preventing an accident due to an electric shock according to the present invention.

The present invention will be described in detail hereinafter with regard to the embodiment shown in the attached drawings. Referring to FIG. 3, a wire-cut electrical discharge machine 10 has a column 12, a base 14, and a control unit 16 including a control circuit for the wire-cut electrical discharge machine and an electric power source 51 for supplying an electrospark power, and a holder 18 holding a Z shaft extended vertically is disposed at a front end of the column 12, an upper head 20 is attached to a lower end of the holder 18, movably along the Z shaft, and an upper wire-guide 22 is disposed at a lower end of the upper head 20. On the other hand, a workpiece table 24 movable along two axes (X axis, Y axis) perpendicular to each other in a horizontal plane perpendicular to the Z shaft, is mounted on the base 14, and a metal workpiece W is fixed on the workpiece table 24. A front end of a lower arm 26 extended from the column 12 is positioned at an inner position of the workpiece table 24, and a lower wire-guide 28 is attached to the front top end of a lower arm. An electrode wire 30 passes through an electrospark machining area 36 after leaving a supply reel 32, while guided by large or small guide rollers and brakes 34 arranged in the column 12, the holder 18, the lower arm 26, and so on, and further, runs along an electrode wire path of the lower arm 26 to be housed in an electrode wire collection section such as a wire collection box 38. An electric power is supplied from the above-mentioned electric power source 51 to the electrode wire 30 through the electric power supply member 35. A well-known pulse discharge circuit unit can be used for the electric power source 51.

In this embodiment, an insulating box cover member 40 covering a device for preventing an accident due to an electric shock, according to the present invention, is disposed just in front of the wire collection section, since a disturbance of a running of the electrode wire 30 usually occurs near a roller device 34a for changing a run direction of the wire 30 just in front of the collection section, due to an abnormal collection of the wire in the collection box 38.

It is possible to attach the cover member 40 to a lower portion of the column 12 when an area just in front of the collection section is positioned at the lower portion of the column 12, although the cover member 40 is attached to a rear portion of the lower arm 26 to cover the electrode wire path because, in the present embodiment, the wire is collected in the collection box 38 through the guide roller device 34a positioned at a rear end of the lower arm 26.

Figure 1:
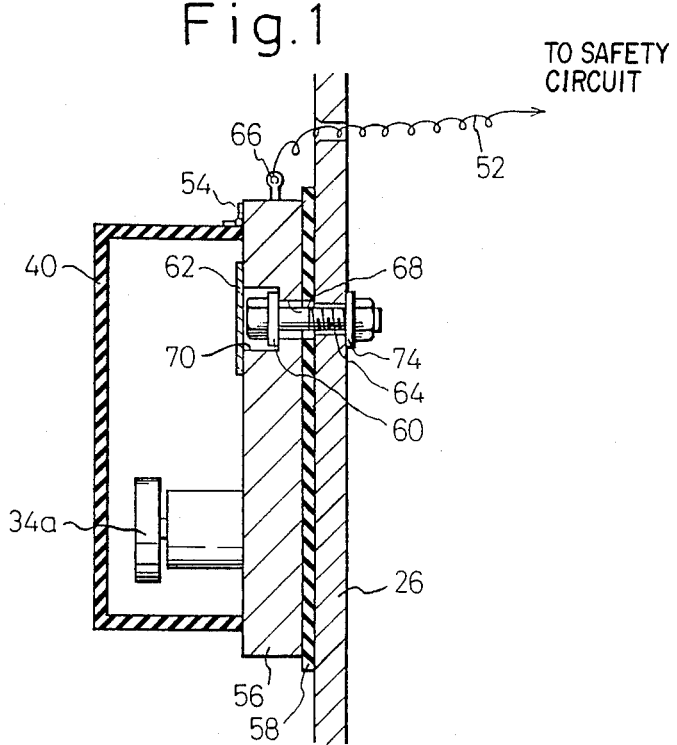
FIG. 1 is an enlarged sectional view taken along the line I—I in FIG. 3 according to the present invention.

Now, referring to FIG. 1, an insulating plate 58 made of an electric insulating material is held between the lower arm 26 and a base plate 56 made of a general structural material, i.e, a conductive steel, to which plate the roller device 34a is attached. The method of attaching the base plate 56 to the lower arm 26 will be described hereinafter. A recessed portion 70 is formed in the base plate 56, and a through hole 68 for inserting a bolt is formed in the recessed portion 70 to form a shoulder portion. On the other hand, the corresponding through holes are formed in the insulating plate 58 and the lower arm 26. A bolt 64, for example, is inserted into the holes while an insulating washer 60 made of an insulting ceramics, etc. is interposed between the base plate 56 and the bolt. The size of the through hole 68 is such that it is not in contact with the bolt 64, and further, a washer 74 in the side of the lower arm 26 may be made of an insulating material, or for example, a ceramics bushing may be inserted between the lower arm and the bolt, so that a leaking electric current does not flow to the lower arm 26 through the bolt 64. The contact of the bolt 64 and the electrode wire 30, the running of which is disturbed, is prevented by a cap 62 made of an insulating material covering a head of the bolt 64.

Figure 2:
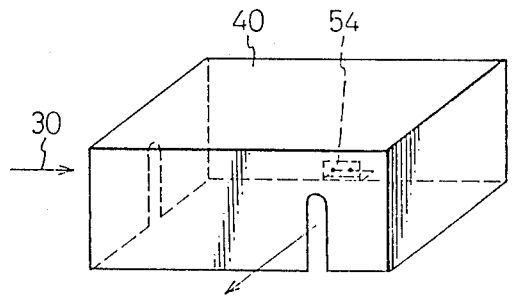
FIG. 2 is a perspective view of a cover for preventing an electric shock.

As mentioned above, an area around the roller device 34a is electrically insulated from the lower arm 26. On the other hand, the insulating box type cover member 40 shown in FIG. 2 made of a plastics is openably attached to the base plate 56 through a hinge 54 so that interference with a circumferential object or the operator, and an electrical contact therebetween, are prevented.

The electrode wire 30 passing through the cover member 40 is loosened so that it touches the conductive base plate 56 when a disturbance occurs in the running thereof caused by an abnormal collection in the wire collection box 38. A lead wire 52 is attached to the base plate 56 through a proper terminal 66 and connected to a safety circuit 50 (shown in FIG. 3) in the control unit 16 led backward as shown in FIG. 1, which direction is preferred because the box type cover member 40 thus does not interfere with the lead wire 52 when the cover member is opened or closed for example, when passed through the lower arm 26. Therefore, a leakage of current to the base plate 56 caused by a disturbance in the running of the electrode wire 30 is rapidly sent to the above-mentioned safety circuit 50. At the same time, when current leakage signal is received, the safety circuit 50 stops an electric power supply to the electrode wire 30, for example, through an operation thereof as a breaker for the electric power source 51. A complete prevention of an accident due to an electric shock can be attained by carrying out a necessary repair treatment while the electric power supply is stopped.

The above-mentioned embodiment is explained with regard to a wire-cut electrical discharge machine having an automatic wire feeder (AWF) which continuously feeds an electrode wire 30. But the present invention also can be applied to a wire-cut electrical discharge machine having a structure for winding an electrode wire onto a reel, which wire has been unwound from an electrode wire supply reel and has passed through the electrospark machining area 36, so that, for example, an electrode wire which has jumped from the reel can be prevented from touching a conductive machine body or surrounding element by directly detecting such a jumped wire from the reel. As mentioned before, the device according to the present invention can be applied to an area just in front of the wire collection section even if the area is at a lower part of the column 12.

As apparent from the foregoing description, according to the present invention, a good safety operation of an wire-cut electrical discharge machine, particularly of an AWF machine, can be attained because a disturbance of the running of an electrode wire of a wire-cut electrical discharge machine caused by an abnormal collection of the wire is electrically detected, to thereby stop an electric power supply before an accident due to an electric shock occurs due to a contact between the disturbed wire and a conductive machine body or element near the same, so that the abnormal collection of the same can be corrected. Furthermore, a high safety can be attained at a low cost because the device for preventing an electric shock according to the present invention has a simple structure and can be constructed with a small amount of steel plate material.

We claim:

1. A wire-cut electrical discharge machine having a means for preventing an accident due to an electric shock, wherein said machine guides an electrode wire which is fed from an electrode wire supply reel, and to which an electric power is supplied from an electric power source via an electric power supply member, and runs to an electrode wire collection section through an electrospark machining area in which a workpiece is machined by an electrospark between the workpiece and the electrode wire, to the electrode wire collection section by means of a roller device disposed just before the electrode wire collection section, said means comprising:

a safety circuit for stopping an electric power supply from said electric power source by a current signal;

a conductive base plate made of a conductive material supporting said roller device;

an insulating layer disposed between and electrically insulating said conductive base plate and a machine body of said wire-cut electrical discharge machine to which said conductive base plate is attached; and a lead wire for leading a current leaking from said electrode wire to said conductive base plate, to said safety circuit.

2. A wire-cut electrical discharge machine having a means for preventing an accident due to an electric shock according to claim 1, wherein said roller device is covered with a box type openable cover made of an insulating material.

3. A wire-cut electrical discharge machine having a means for preventing an accident due to an electric shock according to claim 2, wherein said lead wire is led backward toward a rear side of said machine body located behind said conductive base plate so that interference is prevented when said box type cover is opened or closed.

* * * * *